UNITED STATES PATENT OFFICE.

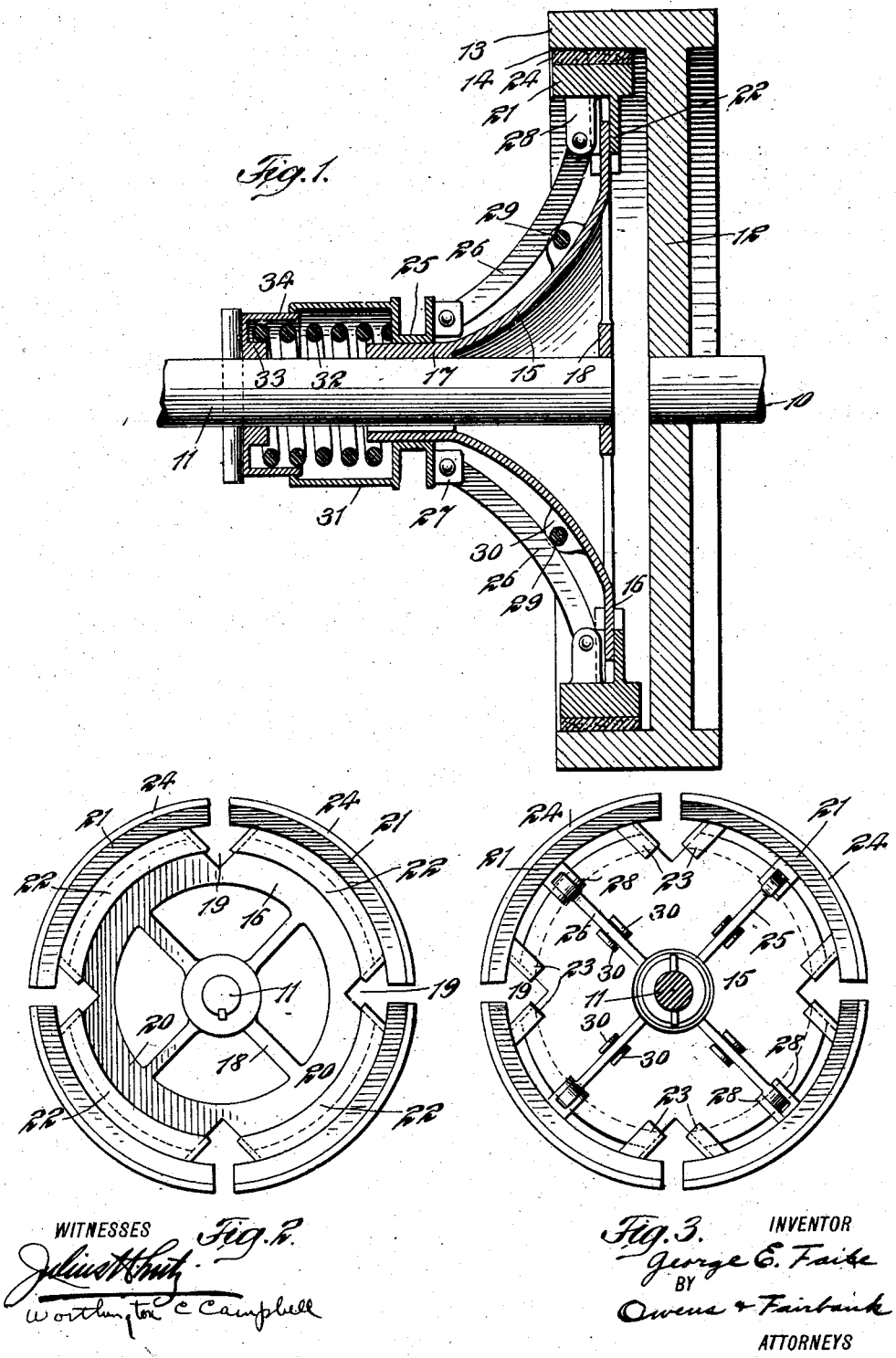

GEORGE E. FAILE, OF NEW YORK, N. Y.

CLUTCH.

994,379.  Specification of Letters Patent.  Patented June 6, 1911.

Application filed October 25, 1910. Serial No. 588,968.

*To all whom it may concern:*

Be it known that I, GEORGE E. FAILE, of the borough of Manhattan, city, county, and State of New York, have invented certain new and useful Improvements in Clutches, of which the following is a full, clear, and exact specification, such as will enable others skilled in the art to which it appertains to make and use the same.

This invention relates to certain improvements in clutches for connecting driving and driven members and relates more particularly to that type of clutch in which one of the members has a plurality of separate shoes or contact members movable outwardly into engagement with an annular contact face upon the other member.

The object of the invention is to provide a simple form of guiding, supporting and operating means for these shoes whereby the number of pieces or parts going to make up the clutch is materially reduced and at the same time the parts given greater rigidity and strength. The shoes are guided upon an annular flange which also serves to prevent any circumferential movement of the shoes in respect to the member of which they form a part. The shoes are moved into and out of operative position by links which are guided and braced intermediate their ends.

The details of my improved clutch may be varied within the scope of the appended claims without departing from the spirit of my invention and therefore I do not wish to be limited to the specific construction hereinafter described.

Reference is to be had to the accompanying drawings forming a part of this specification and in which similar reference characters refer to similar parts in the several views, and in which—

Figure 1 is a longitudinal section through a clutch constructed to embody my invention; Fig. 2 is an end view of one of the clutch members viewed from the right-hand end of Fig. 1; and Fig. 3 is an end view of the same clutch member viewed from the left-hand end of Fig. 1.

My improved clutch is adapted for connecting any form of driving member to a driven member in which the axes are in alinement. In the form shown in the accompanying drawing the clutch is illustrated as applied to two shafts 10 and 11, either one of which may be the driving member and the other the driven member. To simplify the description, I will hereinafter refer to the shaft 10 as being the driving shaft, and the shaft 11 as the driven one. Upon the shaft 10 there is mounted one of the clutch members which is preferably in the form of a fly wheel 12 having an annular peripheral part 13 presenting an inner contact face 14. This face is illustrated as being cylindrical, although it may, if desired, be slightly coned.

Keyed or otherwise rigidly secured to the shaft 11 is a hollow substantially conical member 15 presenting an outer annular flange 16 lying in a plane at right-angles to the axis of rotation and a cylindrical collar 17 directly upon the shaft. The flange portion 16 may be additionally supported by a spider 18 connected to the flange and, if desired, integral with the flange, cone and collar. The flange is provided with a plurality of V-shaped notches 19, about the periphery and the sides of these notches form such angles in respect to each other that the opposite edges of the sections 20 of the flange between the notches are substantially parallel. Mounted upon this flange are a plurality of shoes or contact members, each presenting an outer curved peripheral surface substantially concentric with the inner surface 14 of the annular part 13. Each shoe includes a body portion 21 and a flange 22 adapted to engage with the side of the flange 16 and have sliding contact therewith. The ends of the flanges 22 extend through the notches 19 into engagement with the opposite side of the flange 16 and engage with the parallel edges of the sections 20 so that the brake shoes are guided radially. These extensions 23 of the flanges 22 are on the side of the flange 16 toward the conical member 15 and they may extend each other any desired distance. As shown, they only extend inwardly from the notches a sufficient distance to insure the holding of the flanges 22 against the surface of the flange 16. Upon the outer surface of the body 21 of each brake shoe is a layer 24 of leather or other similar material presenting a friction surface and adapted to directly contact with the surface 14.

For moving the shoes radially into and out of contact with the surface 14, there is provided a collar 25 slidably mounted upon the collar 17 and connected to the several shoes by a plurality of links 26. Each link at one end is held between a pair of lugs 27 on the collar 25 and at the other end between a pair of lugs 28 upon the inner surface of the shoe between the extensions 23. These links are curved to substantially follow the curved surface of the conical member 15 and are braced intermediate their ends by rollers 29 carried by said conical member. Each roller is supported between suitable lugs or bearings 30 upon the outer surface of the conical member and the rollers are so placed and the links so curved that as the collar 25 slides axially and the shoes slide radially the inner edges of the links will remain in contact with the rollers and be supported thereby.

Any suitable means may be provided for moving the collar 25 to bring the brake shoes into and out of operation. As shown, the collar 25 is grooved to receive a yoke not shown and is provided with a flange 31 constituting a portion of a casing inclosing a spring 32 for normally holding the clutch in operation. A collar 33 may be secured to the shaft and held against axial movement and present a flange 34 telescoping with the flange 31 and constituting the remainder of the housing for the spring.

In my improved clutch it will be noted that as the collar 25 is moved to bring the shoes into operation the links travel over the rollers 29 and as the shoes reach their operative position they are firmly braced. The rollers resist any tendency of the links to bend and at the same time prevent any strain being exerted against the flange 16. The flanges 22 are upon the side of the flange 16 opposite to the links so that they resist any tendency of the shoes to be thrown outwardly by centrifugal force unless the collar 25 be moved to a corresponding extent. The shoes engage with the sides of the notches 19 so as to be guided by the latter and positively prevented from any circumferential movement in respect to the flange 16. The sections 20 of the flange are separated to only a slight extent so that these sections together present nearly a complete circle and are greatly strengthened by reason of their circumferential length. The contact surfaces of the several shoes together make up nearly a complete circle so that there is the maximum engagement with the surface 14 of the other member.

Having thus described my invention, what I claim as new and desire to secure by Letters Patent of the United States, is:

1. A clutch having a driving and a driven member, one of said members having an annular part presenting an inner bearing surface and the other of said members having an annular disk provided at its edge with comparatively narrow V-shaped notches, a plurality of shoes each having a curved body portion and a flange in engagement with a corresponding section of the disk between two adjacent notches, said flange having extensions projecting through said notches and in engagement with the opposite face of the disk to guide the shoes and means for operating said shoes simultaneously.

2. A clutch having a driving and a driven member, one of said members having an annular part presenting an inner bearing surface and the other of said members having a substantially conical body member presenting an outer annular flange at the larger end and a collar at the smaller end, a collar guided axially upon said first-mentioned collar, shoes guided radially on said flange and links connecting said shoes to said second-mentioned collar and substantially following the surface of the conical member.

3. A clutch having a driving and a driven member, one of said members having an annular part presenting an inner bearing surface and the other of said members having a substantially conical body member presenting an outer annular flange at the larger end and a collar at the smaller end, a collar guided axially upon said first-mentioned collar, shoes guided radially on said flange and links connecting said shoes to said second-mentioned collar and substantially following the surface of the conical member and rollers upon said conical member for supporting said links intermediate their end.

4. A clutch having a driving and a driven member, one of said members having an annular part presenting an inner bearing surface and the other of said members having a substantially conical body member presenting an annular flange at the larger end thereof, shoes carried by said flange movable in respect thereto, an axially movable collar and lengthwise movable links connecting said collar to said shoes and substantially following the surface of said conical member.

5. A clutch having a driving and a driven member, one of said members having an annular part presenting an inner bearing surface and the other of said members having a substantially conical body member presenting an annular flange at the larger end thereof, shoes carried by said flange and movable in respect thereto, an axially movable collar, links connecting said collar to said shoes and movable lengthwise along the surface of said conical member and guides upon said surface for supporting said links intermediate their ends.

6. A clutch having a driving member and a driven member, one of said members having an annular part presenting an inner bearing surface and the other of said members having a substantially conical body member presenting an outer annular flange at an angle to the adjacent portion of the conical body, and at the larger end of said body member, said flange being subdivided into sections, a plurality of shoes, each radially guided upon its corresponding section, links connected to said shoes, and means for moving said links lengthwise simultaneously, to bring said shoes into or out of operative position.

7. A clutch having a driving member and a driven member, one of said members having an annular part presenting an inner bearing surface and the other of said members having a body portion presenting an outer annular flange, the peripheral portion of which is subdivided into sections, shoes carried by said flange, and having portions engaging with the edges of said sections to prevent relative circumferential movement of the shoes and flange, links connected to said shoes, and means connected to said links for moving them lengthwise to bring the shoes into or out of operative position.

In testimony whereof I have signed my name to this specification in the presence of two subscribing witnesses.

GEO. E. FAILE.

Witnesses:
EDWIN W. WARFIELD,
HAROLD V. CLEANER.

---

Copies of this patent may be obtained for five cents each, by addressing the "Commissioner of Patents, Washington, D. C."